United States Patent
Turner et al.

(10) Patent No.: US 6,444,283 B1
(45) Date of Patent: Sep. 3, 2002

(54) POLYESTER-POLYAMIDE BLENDS WITH REDUCED GAS PERMEABILITY AND LOW HAZE

(75) Inventors: Sam Richard Turner, Kingsport; Gary Wayne Connell, Church Hill; Steven Lee Stafford, Gray; John David Hewa, Kingsport, all of TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/628,623

(22) Filed: Jul. 31, 2000

Related U.S. Application Data

(60) Provisional application No. 60/146,521, filed on Jul. 30, 1999.

(51) Int. Cl.[7] .............................................. C08L 77/00
(52) U.S. Cl. ...................................... 428/35.7; 525/425
(58) Field of Search ........................... 525/425; 428/35.7

(56) References Cited

U.S. PATENT DOCUMENTS

| | | | |
|---|---|---|---|
| 4,501,781 A | 2/1985 | Kushida et al. | 428/35 |
| 5,258,233 A | 11/1993 | Mills et al. | 428/480 |
| 5,266,413 A | 11/1993 | Mills et al. | 428/480 |
| 5,314,987 A | 5/1994 | Kim et al. | 528/289 |
| 5,340,884 A | 8/1994 | Mills et al. | 125/420 |
| 5,866,649 A | 2/1999 | Hong et al. | 524/538 |

FOREIGN PATENT DOCUMENTS

| | | |
|---|---|---|
| EP | 0 092 979 | 11/1983 |
| WO | WO 93/20147 | 10/1993 |
| WO | WO 97/15629 | 5/1997 |
| WO | WO 98/39388 | 9/1998 |

*Primary Examiner*—Ana Woodward
(74) *Attorney, Agent, or Firm*—Bernard J. Graves, Jr., Esq.; Dennis V. Carmen, Esq.

(57) ABSTRACT

The invention relates to polyester/polyamide blend compositions for forming an article having low haze and reduced gas permeability compared to the polyester alone. More specifically, the invention relates to blends of semi-crystalline polyesters such as PET with low molecular weight polyamides and to the containers and packages for food, beverages, cosmetics, pharmaceuticals and personal care products that can be fabricated from these blends.

17 Claims, No Drawings

POLYESTER-POLYAMIDE BLENDS WITH REDUCED GAS PERMEABILITY AND LOW HAZE

This application claims the benefit of U.S. Provisional Application 60/146,521, filed Jul. 30, 1999, which application is incorporated in its entirety by this reference.

BACKGROUND OF THE INVENTION

Field of the Invention

This invention relates to polyester/polyamide blends having low haze and reduced gas permeability properties compared to the polyester alone. More specifically, this invention relates to blends of a semi-crystalline polyester such as poly(ethylene terephthalate) (PET) with low molecular weight high permeability polyamides where significantly reduced gas permeability (over neat PET) is obtained with a low level of haze. These low haze and reduced gas permeability polyester/polyamide blends have practical applications in containers and packages for food, beverages, cosmetics, pharmaceuticals and personal care products that can be fabricated from the blends.

BACKGROUND OF THE INVENTION

Many polyamides are known in the art to possess excellent gas barrier properties. A particularly useful polyamide with high barrier is poly(m-xylylene adipamide), known commercially as MXD6 and produced by Mitsubishi Gas Chemical (Harada, M., Plastics Engineering, Jan. 27, 1998). MXD6 is a high molecular weight polyamide and has found useful applications in multilayer containers, as the middle high barrier layer in trilayer configurations. There are previous disclosures related to polyamide/PET blends that exhibit enhanced gas barrier properties over PET. For example, U.S. Pat. No. 4,501,781 discloses oriented hollow blow-molded containers comprising a mixture of PET and a xylylene group containing polyamide resin where this mixture of polymers is used as a barrier layer in a multilayer configuration so that "high bonding strength" between the layers is maintained. This patent discloses that these blends have "relatively high transparency" and that containers with a high degree of transparency can be provided. It also discloses that compositions having as close to 30% of the xylylene group-containing polyamide resin to PET as possible are necessary for "high gas barrier properties." Furthermore, this patent states that the use of 5–10% by weight of the xylylene group-containing polyamide resin to PET will result in a container that does not have high gas barrier properties. U.S. Pat. No. 5,314,987 discloses blends of MXD6 with polyesters that have been made with catalyst systems that do not contain Co or Mn. The clarity of these blends was said to be enhanced by the addition of Co octoate.

Blends of high molecular weight polyamides, such as MXD6 with PET, are known to have high haze values which limits their use in practical food packaging container applications. However, the use of low molecular weight polyamides has been found to be particularly useful in reducing the haze values in polyester/polyamide blends. U.S. Pat. No. 5,258,233 and 5,266,413 teach that the use of partially aromatic polyamides with number average molecular weights of less than 15,000, at concentrations less than 2.0 wt. %, are useful in preparing high clarity, low haze blends with PET for the reduction of acetaldehyde. Haze values of higher molecular weight polyamides were demonstrated in these patents to be too high for practical use.

Current theories for the enhanced gas barrier properties exhibited when a high molecular weight polymer is blended with a high barrier polymer are based on the development of distinct layered or platelet like morphologies formed from the high barrier component during processing. In order for this kind of deformation, etc. to occur, it has been generally accepted that the high barrier polymer must be at relatively high molecular weight in order to respond to the external mechanical forces in the processing step (G. W. Lohfink and M. R. Kamal, Polymer Engineering and Science, 1993, 33 (21) 1404).

U.S. Pat. No. 5,866,649 teaches that blend compositions of PET and up to about 30% of a xylylene group-containing polyamide have superior barrier and oxygen absorption properties under certain conditions when a transition metal catalyst is present in the blend and the material has been biaxially oriented. The reference also teaches that in oriented blends spherules of barrier material become elongated biaxially, thereby increasing their surface area substantially.

None of the references disclose polyester/low molecular weight polyamide blends having low haze and reduced gas permeability properties that are equivalent to polyester/high molecular weight polyamide blend compositions.

SUMMARY OF THE INVENTION

The present invention provides for polyester/polyamide blend compositions, methods of making and articles of manufacture.

In one embodiment, the invention provides a polymer blend comprising:

I. from about 80 to about 99.5 weight % of a semi-crystalline polyester, which comprises the residues of
   (A) a dicarboxylic acid component comprising repeat units from at least about 85 mole % of terephthalic acid, naphthalene-2,6-dicarboxylic acid or a mixture thereof; and
   (B) a glycol component comprising repeat units from at least about 85 mole % ethylene glycol, based on 100 mole % dicarboxylic acid and 100 mole % glycol; and II. from about 20 to greater than about 2 weight % of a low molecular weight polyamide, having a number average molecular weight of less than about 15,000, having the repeating unit A–D, wherein A is the residue of a dicarboxylic acid comprising adipic acid, isophthalic acid, terephthalic acid, 1,4-cyclohexanedicarboxylic, resorcinol dicarboxylic acid, or naphthalenedicarboxylic acid, or a mixture thereof, and D is a residue of a diamine comprising m-xylylene diamine, p-xylylene diamine, hexamethylene diamine, ethylene diamine, or 1,4-cyclohexanedimethylamine, or a mixture thereof.

In another embodiment, the invention provides a method for reducing gas permeability of polyester comprising blending:

I. from about 80 to about 99.5 weight % of a semi-crystalline polyester, which comprises the residues of:
   (A) a dicarboxylic acid component comprising repeat units from at least about 85 mole % of terephthalic acid, naphthalene-2,6-dicarboxylic acid or a mixture thereof; and
   (B) a glycol component comprising repeat units from at least about 85 mole % ethylene glycol, based on 100 mole % dicarboxylic acid and 100 mole % of glycol; and II. from about 20 to greater than about 2 weight % of a low molecular weight polyamide having a number average molecular weight of less than about 15,000 having the repeating unit A–D, wherein A is the residue of a dicarboxylic acid comprising adipic acid, isophthalic acid, terephthalic acid, 1,4-cyclohexanedicarboxylic, resorcinol dicarboxylic acid, or naphthalenedicarboxylic acid, or a mixture thereof, and D is the residue of a diamine comprising m-xylylene diamine, p-xylylene diamine, hexamethylene diamine, ethylene diamine, or 1,4-cyclohexanedimethylamine, or a mixture thereof.

Additional advantages of the invention will be set forth in part in the detailed description, which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory of preferred embodiments of the invention, and are not restrictive of the invention, as claimed.

DETAILED DESCRIPTION OF THE INVENTION

The invention relates to a polyester/polyamide blend having low haze and reduced gas permeability properties comprising a semi-crystalline polyester and a low molecular weight polyamide having a number average molecular weight of less than about 15,000. Contrary to current theories, the polyester/low molecular weight polyamide blends not only have reduced acetaldehyde levels, but also have low haze and reduced gas permeability levels that are equivalent to high molecular weight polyamide/PET blends. The present polyester/polyamide blends may be processed and molded into a shaped article.

The present invention may be understood more readily by reference to the following detailed description of the invention and the examples provided therein. It is to be understood that this invention is not limited to the specific processes and conditions described, as specific processes and/or process conditions for processing plastic articles as such may, of course, vary. It is also to be understood that the terminology used herein is for the purpose of describing particular embodiments only and is not intended to be limiting.

It must also be noted that, as used in the specification and the appended claims, the singular forms "a," "an" and "the" include plural referents unless the context clearly dictates otherwise. For example, reference to processing or forming an "article," "container" or "bottle" from the process of this invention is intended to include the processing of a plurality of articles, containers or bottles.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

A weight percent of a component, unless specifically stated to the contrary, is based on the total weight of the formulation or composition in which the component is included.

The molecular weight ranges herein refer to the number average molecular weight.

With respect to the polyesters, mole % are based on 100 mole % diacid and 100 mole % glycol, for a total of 200 mole %.

"Optional" or "optionally" means that the subsequently described event or circumstance may or may not occur, and that the description includes instances where said event or circumstance occurs and instances where it does not. For example, the phrase "optionally substituted lower alkyl" means that the lower alkyl group may or may not be substituted and that the description includes both unsubstituted lower alkyl and lower alkyl where there is substitution.

The term "semi-crystalline" is a term well known in the prior art and is meant to describe a polymer that exhibits X-ray patterns that have sharp features characteristic of crystalline regions and diffuse features characteristic of amorphous regions. As is also known in the prior art, semi-crystalline should be distinguished from the pure crystalline and amorphous states.

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH2CH2O—repeat units in the polyester, regardless of whether ethylene glycol is used to prepare the polyester. Similarly, a sebacic acid residue in a polyester refers to one or more —CO(CH2)$_8$CO—moieties in the polyester, regardless of whether the residue is obtained by reacting sebacic acid or an ester thereof to obtain the polyester.

The polyesters are any semi-crystallizable polyester homopolymer or copolymer that are suitable for use in packaging, and particularly food packaging. Suitable polyesters are generally known in the art and may be formed from aromatic dicarboxylic acids, esters of dicarboxylic acids, anhydrides of dicarboxylic esters, glycols and mixtures thereof. More preferably, the polyester is formed from repeat units comprising terephthalic acid, dimethyl terephthalate, isophthalic acid, dimethyl isophthalate, dimethyl 2,6-napthalenedicarboxylate, 2,6-naphthalenedicarboxylic acid, ethylene glycol, 1,4-cyclohexane-dimethanol, 1,4-butanediol or a mixture thereof.

The dicarboxylic acid component of the semi-crystalline polyester may optionally be modified with up to about 20 mole percent and more preferably up to about 15 mole percent of one or more different dicarboxylic acids other than terephthalic acid, isophthalic acid or 2,6-naphthalenedicarboxylic acid. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid and/or naphthalene-2,6-dicarboxylic acid are phthalic acid, isophthalic acid, cyclohexanedicarboxylic acid, cyclohexanediacetic acid, diphenyl 4,4'-dicarboxylic acid, succinic acid, glutaric acid, adipic acid azelaic acid, sebacic acid or a mixture thereof.

In addition, the glycol component of the semi-crystalline polyester may optionally be modified with up to about 6 mole percent of one or more different diols other than ethylene glycol. Examples of such diols include diethylene glycol, triethylene glycol, 1,4-cyclohexanedimethanol, neopentyl glycol, 1-3-propane diol, 1,4-butane diol, 1,5-pentane diol, 1,6-hexane diol, 3-methylpetanediol-(2,4), 2-methylpentanediol (1,4), 2,2,4-trimethylpentane-diol-(1,3), 2-ethylhexanediol-(1,3), 2,2-diethylpropane-diol (1,3), hexanediol-(1,3), 1, 4-di-(hydroxyethoxy)-benzene, 2,2-bis-(4-hydroxycyclohexyl)-propane, 2,4-dihydroxy-1,1,3,3-tetramethylcyclobutane, 2,2-bis-(3-hydroxyethoxyphenyl)-propane, 2,2-bis (4 hydroxypropoxyphenyl)-propane, or a mixture thereof. The preferred semi-crystalline polyester is poly(ethylene terephthalate) (PET). Polyesters may be prepared from two or more of the above diols.

The semi-crystalline polyester resin may also contain small amounts of multifunctional polyols such as trimethylolpropane, pentaerythritol or glycerol. When using 1,4-cyclohexanedimethanol as the diol component in the polyester or copolyester blend composition, cis, trans or cis/trans mixtures may be utilized and when using phenylenedi(oxyacetic acid) as the dicarboxylic acid as the diacid component in the polyester or copolyester blend composition, 1,2-, 1,3-, or 1,4- isomers or a mixture thereof may be utilized.

The semi-crystalline polyester may also contain small amounts of multifunctional acid comonomers to provide controlled branching in the polymers. Suitable trifunctional comonomers include trimellitic anhydride, pyromellitic dianhydride, trimellitic acid, pyromellitic acid and other polyester forming polyacids generally known in the art.

The inherent viscosity ("Ih.V.") of the semi-crystalline polyester in the polyester/polyamide blend composition is preferably from about 0.05 to about 1.0 dL/g, more preferably at least about 0.6 dL/g, and most preferably at least about 0.7 dL/g as measured in a mixture of 60 weight percent phenol and 40 weight percent 1,1,2,2-tetrachloroethane at a concentration of 0.5 g/100 ml (solvent) at 25° C.

The generally known three-stage polyesterifcation process are suitable for use as part of the process of the present invention. The three polymerization stages are hereinafter referred to as the esterification stage, the prepolymer stage and the polycondensation stage. The basic conditions which define these three stages throughout the present application are set out below for convenience and clarity.

In the first stage of the melt phase process, a mixture of polyester monomer (glycol esters of dicarboxylic acid) and oligomers are produced by conventional well-known processes. The process can be an ester exchange process or a direct esterification process. The ester exchange reaction is conducted at a temperature of from about 180° C. to about 250° C. in the presence of suitable ester exchange catalysts such as lithium, magnesium, calcium, manganese, cobalt and zinc. Preferably, the total amount of catalyst is less than about 100 ppm on an elemental basis. Direct esterification can be conducted at temperatures of from about 200° C. to about 260° C. and can be self-acid catalyzed or catalyzed with a suitable esterification catalyst such as titanium, or organic or inorganic acids. The monomer and oligomer mixture in esterification processes is typically produced continuously in a series of one or more reactors operating at elevated temperature and pressures of one atmosphere or greater. Alternatively, the monomer and oligomer mixture could be produced in one or more batch reactors. Suitable colorants may be added to these reactions to control the final color of the polyester. These reactions are generally conducted from about 1 to about 4 hours. It should be understood that generally the lower the reaction temperature, the longer the reaction will have to be conducted.

Generally, at the end of the esterification or ester exchange process, a polycondensation catalyst is added. Suitable polycondensation catalysts include salts of titanium, gallium, germanium, tin, lead, antimony and antimony oxide. Preferred catalysts are antimony, germanium or titanium. Preferably, the amount of catalyst added is from about 20 to about 300 ppm when germanium or antimony is used. Next, the mixture of polyester monomer and oligomer undergoes melt-phase polycondensation to produce a precursor polymer. The precursor polyester is produced in a series of one or more reactors operating at elevated temperatures. To facilitate removal of excess glycols, water, alcohols and other reaction products, the polycondensation reactors are run under a vacuum or purged with an inert gas. Inert gas is any gas that does not cause unwanted reactions or product characteristics. Suitable gases include, but are not limited to carbon dioxide, argon, helium and nitrogen.

Temperatures for this step are generally from about 240° C. to about 280° C. and a pressure of from about 0 to about 2 mm Hg. Once the desired inherent viscosity is reached, the polymer is pelletized. Precursor Ih.V. is generally below about 0.7 to maintain good color. The target inherent viscosity is generally selected to balance good color and minimize the amount of solid stating that is required. Inherent viscosity was measured in a mixture of 60 weight percent phenol and 40 weight percent 1,1,2,2-tetrachloroethane at a concentration of 0.5 g/l100 ml (solvent) at 25° C.

The polyamide component in the blend composition is a low molecular weight polyamide having a number average molecular weight of less than about 15,000. In an embodiment, the polyamide in the blend composition is a low molecular weight polyamide having a number average molecular weight of less than about 12,000. In yet another embodiment, the polyamide in the blend composition is a low molecular weight polyamide having a number average molecular weight of less than about 8,000.

In one embodiment, the amount of low molecular weight polyamide in the blend composition is preferably from about 20 to greater than about 2 weight %, more preferably from about 20 to greater than 2 weight %. In other embodiments, the amount of low molecular weight polyamide in the blend composition on the low end is from about 2.1, or from about 2.5, or from about 3.0, or from about 4.0 or from about 8.0 weight %, with the high end being to about 15 or to about 20 weight %. Any low end endpoint can be used with any high end endpoint.

The low molecular weight polyamide component of the blend composition of the present invention is represented by repeating unit A–D, wherein A is the residue of a dicarboxylic acid including adipic acid, isophthalic acid, terephthalic acid, 1,4-cyclohexanedicarboxyolic acid, resorcinol dicarboxylic acid, naphthalene-2,6-dicarboxylic acid or a mixture thereof, and D is the residue of a diamine including m-xylylene diamine, p-xylylene diamine, hexamethylene diamine, ethylene diamine, 1,4-cyclohexanedimethylamine or a mixture thereof. Preferred polyamides that can be used in this invention include poly(m-xylylene adipamide) or a copolymer thereof, isophthalic or terephthalic acid-modified poly (m-xylylene adipamide), nylon-6, nylon-6,6- or a mixture thereof, poly(hexamethylene isophthlamide), poly (hexamethylene adipamide-co-isophthalamide), poly (hexamethylene adipamide-co-isophthalamide, poly (hexamethylene adipamide-co-terephthalamide) or poly (hexamethylene isophthalamide-co-terephthalamide).

The low molecular weight polyamide may also contain small amounts of trifunctional or tetrafunctional comonomers including trimellitic anhydride, pyromellitic dianhydride or other polyamide forming polyacids and polyamines known in the art.

The Ih.V. for the polyamides in the blend composition is preferably less than about 1.0 dL/g, more preferably less than about 0.8 dL/g and most preferably less than about 0.6 dL/g as measured in a mixture of 60 weight percent phenol and 40 weight percent 1,1,2,2-tetrachloroethane at a concentration of 0.5 g/100 ml (solvent) at 25° C.

The preparation of low molecular weight polyamides and polyester/polyamide blend compositions is described in detail in U.S. Pat. No. 5,340,884 ('884), the teachings of which are herein incorporated by reference.

Although not required, additives may be used in the polyester/polyamide blend composition if desired. Conventional known additives include, but are not limited to an additive of a colorant, pigment, carbon black, glass fiber, impact modifier, antioxidant, surface lubricant, denesting agent, UV light absorbing agent, metal deactivator, filler, nucleating agent, stabilizer, flame retardant, reheat aid, crystallization aid, acetaldehyde reducing compound, recycling release aid, oxygen scavenging material, platelet particle, or a mixture thereof.

All of these additives and many others and their use are known in the art and do not require extensive discussion. Therefore, only a limited number will be referred to, it being understood that any of these compounds can be used in any combination so long as they do not hinder the present invention from accomplishing its objects.

This invention also relates to articles produced from the polyester/polyamide blend composition, including, but not limited to a bottle, film, fiber, packaging material, sheet, pipe, tube, profile, molded article, preform, stretch blow molded film and container, injection blow molded container, extrusion blow molded film and container, thermoformed article, such as a tray and the like. The container is preferably a bottle.

The articles may also be multilayered. The multilayered articles may be composed of at least two layers. Preferably, the multilayered articles have the polyester/polyamide blend composition disposed intermediate to other layers, although the blend may also be one layer of a two-layered article. In a preferred embodiment, the article has five layers comprising (a) a first and fifth layer comprising poly(ethylene terephthalate) or a copolymer thereof, (b) a third layer comprising recycled poly(ethylene terephthalate) or a copolymer thereof, and (c) a second and fourth layer formed from the polyester/polyamide blend composition.

Multilayered articles may also be composed of three or four layers. In these layered articles the polyamide may be blended with recycled PET or the polyester/polyamide blend may be further blended with recycled PET.

In the multilayered article, the poly(ethylene terephthalate) layer may be poly(ethylene terephthalate) modified with from greater than 0 to about 20% of napthalenedicarboxylic acid or isophthalic acid. Preferably, the polyester layer in the invention is a poly(ethylene terephthalate). It is preferable that at least 80 mole % of the structural unit of the polyester is ethylene terephthalate units, and it is possible to use a dicarboxylic acid, such as phthalic acid, isophthalic acid, hexahydrophthalic acid, naphthalene-dicarboxylic acid, succinic acid, adipic acid or sebacic acid, or a polyfunctional carboxylic acid such as trimelletic acid or pyromelletic acid as an acid component in the range of from greater than 0 to about 20 mole % of the total acid component.

It is possible to use a glycol such as 1,2-propanediol, 1,3-propanediol, 1,4 butanediol, 1,6-hexanediol, neopentyl glycol, ethylene glycol, diethylene glycol, triethylene glycol, or cyclohexanedimethanol, or a polyvalent alcohol such as trimethylolpropane, triethyloylpropane, or pentaerythritol in the range of from about greater than 0 to about 40 mole % of the total glycol component.

The polyester layer containing poly(ethylene terephthalate) can be produced by a known polymerization method as described above for the polyester/polyamide blend of the present invention. The polyester may be subjected to solid state polymerization, if necessary. The solid-state polymerization is ordinarily carried out at from about 170° C. to a temperature directly below the melting point of the polyester, preferably from about 180 to about 230° C. for about 24 hours.

In the multilayered article, the recycled poly(ethylene terephthalate) layer may be from recycled material obtained from recycled hot runners from the molding process, recycled bottles and the like.

EXAMPLES

The following examples and experimental results are set forth so as to provide those of ordinary skill in the art with a complete disclosure and description of how the polyester/polyamide blends claimed herein are made and evaluated, and are not intended to limit the scope of what the inventors regard as their invention. Efforts have been made to ensure accuracy with respect to numbers (e.g., amounts, temperature, etc.); however, some errors and deviations may have occurred. Unless indicated otherwise, parts are parts by weight, temperature is in °C. or is at ambient temperature, and pressure is at or near atmospheric.

MXD6

The product MXD6 is a high molecular weight poly(m-xylylene adipamide) obtained from Mitsubishi Gas Chemical.

Low Molecular Weight Poly(m-xylvlene Adipamide)

The low molecular weight poly(m-xylylene adipamide) of the present invention was prepared by standard polyamide processes. The preparation of low molecular weight polyamides is described in detail in U.S. Pat. No. 5,340,884, the teachings of which are herein incorporated by reference. Alternatively, a stoichiometrically balanced charge of diamine and di acid, polymerized under conversion control can also yield polyamides with the desired number average molecular weight of less than 15,000 with an approximately equal population of amine and carboxylic acid end groups.

Example 1

Polyester/Polyamide Blend Composition (Pellet to Pellet Mix)

In Table 1, the appropriate amounts of PET and the selected polyamide were weighed out and pellet to pellet mixed before compounding in a Leistritz Micro 18 extruder to melt blend the components. The samples in Table 1 were dried at 120° C. for 16 hours prior to processing and subsequently processed at 270° C.

TABLE 1

| BLEND IDENTIFICATION | PET 9921 (g) | MXD6 (g) | LMWPA (g) |
| --- | --- | --- | --- |
| PET 9921 | 1000 | None | None |
| PET 9921/1% MXD6 | 990 | 10 | None |
| PET 9921/2% MXD6 | 980 | 20 | None |
| PET 9921/5% MXD6 | 950 | 50 | None |
| PET 9921/1% LMWPA | 990 | None | 10 |

TABLE 1-continued

| BLEND IDENTIFICATION | PET 9921 (g) | MXD6 (g) | LMWPA (g) |
|---|---|---|---|
| PET 9921/2% LMWPA | 980 | None | 20 |
| PET 9921/5% LMWPA | 950 | None | 50 |

PET 9921 is commercial grade semi-crystalline PET available from Eastman Chemical Company.
MXD6 is grade 6007 available from Mitsubishi Chemical Company.
LMWPA is amino end-capped poly(m-xylylene adipamide), Mn less than 15,000.

Example 2

Polyester/Polyamide Blend Composition (From a Concentrate)

A 25% concentrate of MXD6 in PET 9921 or LMWPA in PET 9921 was prepared by the following procedure:

To prepare the MXD6 concentrate, 250 g of MXD6 was pellet to pellet blended with 750 g of PET 9921 and compounded on the Leistritz Micro 18 extruder. Both the MXD6 and PET 9921 were dried at 120° C. for 16 hours prior to processing and subsequently processed at 270° C.

To prepare the LMWPA concentrate, 250 g of LMWPA was pellet to pellet blended with 750 g of PET 9921 and compounded on the Leistritz Micro 18 extruder. The LMWPA and PET 9921 samples in Table 2 were dried at 120° C. for 16 hours prior to processing and subsequently processed at 270° C.

TABLE 2

| BLEND IDENTIFICATION | PET 9921 (g) | MXD6 Concentrate (g) | LMWPA Concentrate (g) |
|---|---|---|---|
| PET 9921 | 1000 | None | None |
| PET 9921/1% MXD6 | 960 | 40 | None |
| PET 9921/2% MXD6 | 920 | 80 | None |
| PET 9921/5% MXD6 | 800 | 200 | None |
| PET 9921/1% LMWPA | 960 | None | 40 |
| PET 9921/2% LMWPA | 920 | None | 80 |
| PET 9921/5% LMWPA | 800 | None | 200 |

PET 9921 is commercial grade PET available from Eastman Chemical Company.
MXD6 is grade 6007 available from Mitsubishi Chemical Company.
LMWPA is amino end-capped poly(m-xylylene adipamide), Mn less than 15,000.

Acetaldehyde Levels in Bottle Preform

Bottle preforms were made by mixing 8% by weight of the concentrate in Example 2 with PET 9921 to form a pellet to pellet blend, which contained 2 weight % of the LMWPA. This material was injection molded on a Husky injection molding machine to form bottle preforms. The preforms were grounded and the acetaldehyde (AA) levels determined, as shown in Table 3, using standard gas chromatography techniques. The preforms of PET 9921, not containing LMWPA, were run as controls A and B. The AA levels in Table 3 demonstrate that the inventive semi-crystalline polyester/LMWPA blend compositions exhibit reduced acetaldehyde levels in addition to reduced gas permeability in Table 4.

TABLE 3

| Sample | AA in ppm |
|---|---|
| Control (A) | 12.1 |
| Control (B) | 12.2 |
| 2% LMWPA (A) | 0.77 |
| 2% LMWPA (B) | 0.78 |

Controls A and B were run with PET 9921 only.

Example 3

Preparation of Films

The blended pellets from Example 1 were extruded on a 1 inch Killion film extruder and gas permeability and haze measurements were made on extruded film and film that was biaxially oriented 4×4. The film was 6 inches (15.24 cm) in width and had a thickness of 20 mils. These results are shown in Table 4. The blends with the LMWPA clearly show low haze and reduced gas permeability properties when compared to the MXD6 blends, which show reduced gas permeability, but with approximately 2–5 times higher haze levels.

TABLE 4

| Blend Level and Type | Film IV DL/g | Extruded film % Haze | Extruded Film $O_2$ Perm.* | Oriented Film % Haze | Oriented Film $O_2$ Perm.* |
|---|---|---|---|---|---|
| PET 9921 | 0.73 | 1.23 | 12.1 | 0.12 | 8.1 |
| PET 9921/1% MXD6 | 0.65 | 1.71 | 16.7 | 0.70 | 7.1 |
| PET 9921/2% MXD6 | 0.65 | 3.16 | 15.5 | 1.56 | 5.7 |
| PET 9921/5% MXD6 | 0.64 | 7.58 | 12.5 | 4.86 | 3.9 |
| PET 9921/1% LMWPA** | 0.66 | 1.35 | 13.8 | 0.45 | 6.9 |
| PET 9921/2% LMWPA** | 0.66 | 1.35 | 15.9 | 0.46 | 6.1 |
| PET 9921/5% LMWPA** | 0.63 | 1.60 | 13.0 | 0.94 | 4.1 |

*cc-mil/100 in$^2$-atm-24 hr
**LMWPA = amino end-capped poly(m-xylylene adipamide), $M_n$ less than 15,000.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:
1. A polymer blend comprising:
   I. from 80 to 97.5 weight % of a semi-crystalline polyester, which comprises the residues of
      (A) a dicarboxylic acid component comprising repeat units from at least about 80 mole % of terephthalic acid, isophthalic acid, naphthalene-2,6-dicarboxylic acid or a mixture thereof; and
      (B) a glycol component comprising repeat units from at least about 85 mole % ethylene glycol,
      wherein components A) and B) are based on 100 mole % dicarboxylic acid and 100 mole % of glycol; and
   II. from 20 to 2.5 weight % of a low molecular weight polyamide, having a number average molecular weight of less than about 15,000, having the repeating unit A–D, wherein A is the residue of a dicarboxylic acid comprising adipic acid, isophthalic acid, terephthalic acid, 1,4-cyclohexanedicarboxylic, resorcinol dicarboxylic acid, or naphthalenedicarboxylic acid, or a mixture thereof, and D is a residue of a diamine comprising m-xylylene diamine, p-xylylene diamine, hexamethylene diamine, ethylene diamine, or 1,4-cyclohexanedimethylamine, or a mixture thereof, wherein components I and II total 100weight % of the polymer blend.

2. The polymer blend of claim 1, wherein the dicarboxylic acid component of the semi-crystalline polyester comprises terephthalic acid.

3. The polymer blend of claim 1, wherein the dicarboxylic acid component of the semi-crystalline polyester comprises naphthalenedicarboxylic acid.

4. The polymer blend of claim 1, wherein the dicarboxylic acid component of the semi-crystalline polyester is modified with up to about 20 mole % of phthalic acid, cyclohexanedicarboxylic acid, cyclohexanediacetic acid, diphenyl-4,4'-dicarboxylic acid, succinic acid, glutaric acid, adipic acid, azelaic acid, sebacic acid or a mixture thereof.

5. The polymer blend of claim 1, wherein the glycol component is modified with up to about 6 mole % of diethylene glycol, triethylene glycol, 1,4-cyclohexanedimethanol, neopentyl glycol, 1-3-propane diol, 1,4-butane diol, 1,5-pentane diol, 1,6-hexane diol, 3-methylpetanediol-(2,4), 2-methylpentanediol (1,4), 2,2,4-trimethylpentane-diol-(1,3), 2-ethylhexanediol-(1,3), 2,2-diethylpropane-diol (1,3), hexanediol-(1,3), 1,4-di-(hydroxyethoxy)-benzene, 2,2-bis-(4-hydroxycyclohexyl)-propane, 2,4-dihydroxy-1,1,3,3-tetramethylcyclobutane, 2,2-bis-(3-hydroxyethoxyphenyl)-propane, 2,2-bis (4 hydroxypropoxyphenyl)-propane or a mixture thereof.

6. The polymer blend of claim 1, wherein the molecular weight of the polyamide is less than about 12,000.

7. The polymer blend of claim 1, wherein in the repeating unit A–D, A comprises adipic acid and D comprises m-xylylene diamine.

8. The polymer blend of claim 1, wherein the blend further comprises a multifunctional polyol comprising trimethylolpropane, pentaerythritol or glycerol.

9. The polymer blend of claim 1, wherein the polyester has an inherent viscosity of from about 0.05 to about 1.0 dL/g as measured in a mixture of 60 weight percent phenol and 40 weight percent 1,1,2,2-tetrachloroethane at a concentration of 0.5 g/100 ml solvent at 25° C.

10. The polymer blend of claim 1, wherein the polyamide has an inherent viscosity of less than about 1.0 dL/g as measured in a mixture of 60 weight percent phenol and 40 weight percent 1,1,2,2-tetrachloroethane at a concentration of 0.5 g/100 ml solvent at 25° C.

11. A method for reducing gas permeability of polyester comprising blending:

I. from 80 to 97.5 weight % of a semi-crystalline polyester, which comprises the residues of:
(A) a dicarboxylic acid component comprising repeat units from at least about 85 mole % of terephthalic acid, naphthalene-2,6-dicarboxylic acid or a mixture thereof; and
(B) a glycol component comprising repeat units from at least about 85 mole % ethylene glycol,
wherein components A) and B) are based on 100 mole % dicarboxylic acid and 100 mole % of glycol; and
II. from 20 to 2.5 weight % of a low molecular weight polyamide having a number average molecular weight of less than about 15,000 having the repeating unit A–D, wherein A is the residue of a dicarboxylic acid comprising adipic acid, isophthalic acid, terephthalic acid, 1,4-cyclohexanedicarboxylic, resorcinol dicarboxylic acid, or naphthalenedicarboxylic acid, or a mixture thereof, and D is the residue of a diamine comprising m-xylylene diamine, p-xylylene diamine, hexamethylene diamine, ethylene diamine, or 1,4-cyclohexanedimethylamine, or a mixture thereof, wherein components I and II total 100 weight % of the polymer blend.

12. The method of claim 11, wherein the low molecular weight polyamide is from about 20 to about 2.5 weight %.

13. The article of claim 12, wherein the article is a bottle, sheet, film, tubing, profile, preform, fiber, container or tray.

14. A polymer blend comprising:

I. from about 80 to about 97 weight % of a semi-crystalline polyester, which comprises the residues of
(A) a dicarboxylic acid component comprising repeat units from at least about 80 mole % of terephthalic acid, isophthalic acid, naphthalene-2,6-dicarboxylic acid or a mixture thereof; and
(B) a glycol component comprising repeat units from at least about 85 mole % ethylene glycol,
wherein components A) and B) are based on 100 mole % dicarboxylic acid and 100 mole % of glycol; and
II. from about 20 to about 3 weight %, having a number average molecular weight of less than about 15,000, having the repeating unit A–D, wherein A is the residue of a dicarboxylic acid comprising adipic acid, isophthalic acid, terephthalic acid, 1,4-cyclohexanedicarboxylic, resorcinol dicarboxylic acid, or naphthalenedicarboxylic acid, or a mixture thereof, and D is a residue of a diamine comprising m-xylylene diamine, p-xylylene diamine, hexamethylene diamine, ethylene diamine, or 1,4-cyclohexanedimethylamine, or a mixture thereof, wherein components I and II total 100 weight % of the polymer blend.

15. A method for reducing gas permeability of polyester comprising blending:

I. from about 80 to about 97 weight % of a semi-crystalline polyester, which comprises the residues of:
(A) a dicarboxylic acid component comprising repeat units from at least about 85 mole % of terephthalic acid, naphthalene-2,6-dicarboxylic acid or a mixture thereof; and
(B) a glycol component comprising repeat units from at least about 85 mole % ethylene glycol,
wherein components A) and B) are based on 100 mole % dicarboxylic acid and 100 mole % of glycol; and
II. from about 20 to about 3 weight %, having a number average molecular weight of less than about 15,000, having the repeating unit A–D, wherein A is the residue of a dicarboxylic acid comprising adipic acid, isophthalic acid, terephthalic acid, 1,4-cyclohexanedicarboxylic, resorcinol dicarboxylic acid, or naphthalenedicarboxylic acid, or a mixture thereof, and D is a residue of a diamine comprising m-xylylene diamine, p-xylylene diamine, hexamethylene diamine, ethylene diamine, or 1,4-cyclohexanedimethylamine, or a mixture thereof, wherein components I and II total 100 weight % of the polymer blend.

16. An article comprising a polymer blend comprising:

I. from 80 to 97.5 weight % of a semi-crystalline polyester, which comprises the residues of (A) a dicarboxylic acid component comprising repeat units from at least about 80 mole % of terephthalic acid, naphthalene-2,6-dicarboxylic acid or a mixture thereof; and (B) a glycol component comprising repeat units from at least about 85 mole % ethylene glycol, wherein components A) and B) are based on 100 mole % dicarboxylic acid and 100 mole % of glycol; and II. from 20 to 2.5 weight % of a low molecular weight polyamide, having a number average molecular weight of less than about 15,000, having the repeating unit A–D, wherein A is the residue of a dicarboxylic acid comprising adipic acid, isophthalic acid, terephthalic acid, 1,4-cyclohexanedicarboxylic, resorcinol dicarboxylic acid, or naphthalenedicarboxylic acid, or a mixture thereof, and D is a residue of a diamine comprising m-xylylene diamine, p-xylylene diamine, hexamethylene diamine, ethylene diamine, or 1,4-cyclohexanedimethylamine, or a mixture thereof, wherein components I and II total 100 weight % of the polymer blend and wherein the article has a haze value of from about 2 to about 5 times less than a polymer blend comprising polyester terephthalate and MXD6.

17. The article of claim 16, wherein the article is a bottle, sheet, film, tubing, profile, preform, fiber, container or tray.

* * * * *

UNITED STATES PATENT AND TRADEMARK OFFICE
CERTIFICATE OF CORRECTION

PATENT NO.    : 6,444,283 B1
DATED         : September 3, 2002
INVENTOR(S)   : Turner et al.

It is certified that error appears in the above-identified patent and that said Letters Patent is hereby corrected as shown below:

Column 12,
Lines 12-13, delete Claim 12 and insert therefore the following claim:

-- Claim 12. And article made by the polyester blend produced by the method of claim 11. --

Signed and Sealed this

Fourth Day of February, 2003

JAMES E. ROGAN
*Director of the United States Patent and Trademark Office*

(12) INTER PARTES REEXAMINATION CERTIFICATE (0135th)
United States Patent
Turner et al.

(10) Number: US 6,444,283 C1
(45) Certificate Issued: Jan. 12, 2010

(54) POLYESTER-POLYAMIDE BLENDS WITH REDUCED GAS PERMEABILITY AND LOW HAZE

(75) Inventors: Sam Richard Turner, Kingsport, TN (US); Gary Wayne Connell, Church Hill, TN (US); Steven Lee Stafford, Gray, TN (US); John David Hewa, Kingsport, TN (US)

(73) Assignee: Eastman Chemical Company, Kingsport, TN (US)

Reexamination Request:
No. 95/000,079, Feb. 28, 2005

Reexamination Certificate for:
Patent No.: 6,444,283
Issued: Sep. 3, 2002
Appl. No.: 09/628,623
Filed: Jul. 31, 2000

Certificate of Correction issued Feb. 4, 2003.

Related U.S. Application Data

(60) Provisional application No. 60/146,521, filed on Jul. 30, 1999.

(51) Int. Cl.
C08L 67/02 (2006.01)
C08L 67/00 (2006.01)

(52) U.S. Cl. ...................................... 428/35.7; 525/424
(58) Field of Classification Search ................. 428/35.7; 525/425
See application file for complete search history.

(56) References Cited

U.S. PATENT DOCUMENTS

| | | | |
|---|---|---|---|
| 4,837,115 A | | 6/1989 | Igarashi et al. |
| 5,302,430 A | * | 4/1994 | Ardechir et al. ............ 428/35.7 |
| 5,340,884 A | * | 8/1994 | Mills et al. .................. 525/420 |
| 5,650,469 A | * | 7/1997 | Long et al. .................. 525/425 |
| 5,696,208 A | | 12/1997 | Al Ghatta et al. |
| 5,985,389 A | * | 11/1999 | Dalton et al. .............. 428/35.7 |
| 6,239,233 B1 | * | 5/2001 | Bell et al. .................... 525/425 |

FOREIGN PATENT DOCUMENTS

| | | |
|---|---|---|
| JP | 10007893 A * | 1/1998 |
| WO | WO 00/22043 A1 * | 2/2000 |

OTHER PUBLICATIONS

Mitsubishi Gas Chemical Company, Inc., Nylon–MXD6, More Properties, website: ☐☐www.mgc–a.com/Pages/MXD6/mxd6–moreProp.html, printed Apr. 19, 2005.*
Polymeric Materials Encyclopedia, Joseph C. Salamone editor–in–chief, CRC Press, 1996, v. 8, pp. 6091–6100.*
Rosato, Dominick V., Rosato's Plastics Encyclopedia and Dictionary, Hanser Publishers, 1993, pp. 19, 20, 161, 162.*
Drover et al., "Contribution to Poly(m–xylylene adipamide) Characterization: Hydrolysis, Condensation, and Oxidation in the Melt", Journal of Polymer Science: Part A: Polymer Chemistry, 34, 1039–1047 (1996).*
Slade, Philip E., Jr., Polymer Molecular Weights, Part I, Marcel Dekker, Inc., 1975, pp. 31–39.*
http://ofi.epoline.org/view/GetDossier, public file wrapper of European Patent.1 200 522 B1, printed on Jul. 2, 2005.
Patent Abstracts of Japan, Atsushi et al., Toray Inc. Ind., JP 60177021 A (Sep. 11, 1985).

* cited by examiner

*Primary Examiner*—Stephen J Stein

(57) ABSTRACT

The invention relates to polyester/polyamide blend compositions for forming an article having low haze and reduced gas permeability compared to the polyester alone. More specifically, the invention relates to blends of semi-crystalline polyesters such as PET with low molecular weight polyamides and to the containers and packages for food, beverages, cosmetics, pharmaceuticals and personal care products that can be fabricated from these blends.

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 6, 7 and 12 are cancelled.

Claims 1–5, 8–11 and 13–16 are determined to be patentable as amended.

Claim 17, dependent on an amended claim, is determined to be patentable.

New claims 18–34 are added and determined to be patentable.

1. [A] *An article, which comprises a* polymer blend comprising:
   I. from 80 to [97.5] *about 92* weight % of a semi-crystalline polyester, which comprises the residues of
      (A) a dicarboxylic acid component comprising repeat units from at least about 80 mole % of terephthalic acid, isophthalic acid, naphthalene-2,6-dicarboxylic acid or a mixture thereof; and
      (B) a glycol component comprising repeat units from at least about 85 mole % ethylene glycol,
   wherein components A) and B) are based on 100 mole % dicarboxylic acid and 100 mole % of glycol; and
   II. [from 20 to 2.5 weight % of] a low molecular weight polyamide *in an amount effective to impart reduced gas permeability to the article compared to an article comprising the semi-crystalline polyester alone, wherein the polyamide is present in an amount of from 20 to about 8 weight %*, having a number average molecular weight of [less than about 15,000] *5,800 or less, and* having the repeating unit A-D, wherein A is the residue of a dicarboxylic acid comprising adipic acid[, isophthalic acid, terephthalic acid, 1,4-cyclohexanedicarboxylic, resorcinol dicarboxylic acid, or naphthalenedicarboxylic acid, or a mixture thereof], and D is a residue of a diamine comprising m-xylylene diamine[, p-xylylene diamine, hexamethylene diamine, ethylene diamine, or 1,4-cyclohexanedimethylamine, or a mixture thereof], *wherein the ratio of amino end groups to acid end groups in the polyamide is greater than 1:1;*
   wherein components I and II total [100weight %] *100 weight* % of the polymer blend, *and*
   *wherein the article is a molded article, a thermoformed article, a packaging material, a film, a sheet, a fiber, a pipe, a tube or a profile.*

2. The [polymer blend] *article* of claim 1, wherein the dicarboxylic acid component of the semi-crystalline polyester comprises terephthalic acid.

3. The [polymer blend] *article* of claim 1, wherein the dicarboxylic acid component of the semi-crystalline polyester comprises naphthalenedicarboxylic acid.

4. The [polymer blend] *article* of claim 1, wherein the dicarboxylic acid component of the semi-crystalline polyester is modified with up to about 20 mole % of phthalic acid, cyclohexanedicarboxylic acid, cyclohexanediacetic acid, diphenyl-4,4'-dicarboxylic acid, succinic acid, glutaric acid, adipic acid, azelaic acid, sebacic acid or a mixture thereof.

5. The [polymer blend] *article* of claim 1, wherein the glycol component is modified with up to about 6 mole % of diethylene glycol, triethylene glycol, 1,4-cyclohexanedimethanol, neopentyl glycol, 1-3-propane diol, 1,4-butane diol, 1,5-pentane diol, 1,6-hexane diol, 3-methylpetanediol-(2,4), 2-methylpentanediol (1,4), 2,2,4-trimethylpentane-diol-(1,3), 2-ethylhexanediol-(1,3), 2,2-diethylpropane-diol (1,3), hexanediol-(1,3), 1,4-di-(hydroxyethoxy)-benzene, 2,2-bis-(4-hydroxycyclohexyl)-propane, 2,4-dihydroxy-1,1,3,3-tetramethylcyclobutane, 2,2-bis-(3-hydroxyethoxyphenyl)-propane, 2,2-bis (4 hydroxypropoxyphenyl)-propane or a mixture thereof.

8. The [polymer blend] *article* of claim 1, wherein the blend further comprises a multifunctional polyol comprising trimethylolpropane, pentaerythritol or glycerol.

9. The [polymer blend] *article* of claim 1, wherein the polyester has an inherent viscosity of from about 0.05 to about 1.0 dL/g as measured in a mixture of 60 weight percent phenol and 40 weight percent 1,1,2,2-tetrachloroethane at a concentration of 0.5 g/100 ml solvent at 25° C.

10. The [polymer blend] *article* of claim 1, wherein the polyamide has an inherent viscosity of less than about 1.0 dL/g as measured in a mixture of 60 weight percent phenol and 40 weight percent 1,1,2,2-tetrachloroethane at a concentration of 0.5 g/100 ml solvent at 25° C.

11. A method for reducing gas permeability of polyester *in an article*, comprising blending:
    I. from 80 to [97.5] *about 92* weight % of a semi-crystalline polyester, which comprises the residues of:
       (A) a dicarboxylic acid component comprising repeat units from at least about 85 mole % of terephthalic acid, naphthalene-2,6-dicarboxylic acid or a mixture thereof; and
       (B) a glycol component comprising repeat units from at least about 85 mole % ethylene glycol,
    wherein components A) and B) are based on 100 mole % dicarboxylic acid and 100 mole % of glycol; and
    II. [from 20 to 2.5 weight % of] a low molecular weight polyamide *in an amount effective to impart reduced gas permeability to the article compared to an article comprising the semi-crystalline polyester alone, wherein the polyamide is present in an amount of from 20 to about 8 weight %*, having a number average molecular weight of [less than about 15,000] *5,800 or less, and* having the repeating unit A-D, wherein A is the residue of a dicarboxylic acid comprising adipic acid[, isophthalic acid, terephthalic acid, 1,4-cyclohexanedicarboxylic, resorcinol dicarboxylic acid, or naphthalenedicarboxylic acid, or a mixture thereof], and D is the residue of a diamine comprising m-xylylene diamine[, p-xylylene diamine, hexamethylene diamine, ethylene diamine, or 1,4-cyclohexanedimethylamine, or a mixture thereof], *wherein the ratio of amino end groups to acid end groups in the polyamide is greater than 1:1;*
    wherein components I and II total 100 weight % of the polymer blend, *and producing the article from the blend,*
    *wherein the article is a molded article, a thermoformed article, a packaging material, a film, a sheet, a fiber, a pipe, a tube or a profile.*

13. The article of claim [12] *1*, wherein the article is a bottle, sheet, film, tubing, profile, preform, fiber, container or tray.

14. [A] *An* article, *which comprises a* polymer blend comprising:
 I. from about 80 to about [97] *92* weight % of a semi-crystalline polyester, which comprises the residues of
  (A) a dicarboxylic acid component comprising repeat units from at least about 80 mole % of terephthalic acid, isophthalic acid, naphthalene-2,6-dicarboxylic acid or a mixture thereof; and
  (B) a glycol component comprising repeat units from at least about 85 mole % ethylene glycol,
 wherein components A) and B) are based on 100 mole % dicarboxylic acid and 100 mole % of glycol; and
 II. [from about 20 to about 3 weight %] *a low molecular weight polyamide in an amount effective to impart reduced gas permeability to the article compared to an article comprising the semi-crystalline polyester alone, wherein the polyamide is present in an amount of from about 20 to about 8 weight%,* having a number average molecular weight of [less than about 15,000] *5,800 or less, and* having the repeating unit A-D, wherein A is the residue of a dicarboxylic acid comprising adipic acid[, isophthalic acid, terephthalic acid, 1,4-cyclohexanedicarboxylic, resorcinol dicarboxylic acid, or naphthalenedicarboxylic acid, or a mixture thereof], and D is a residue of a diamine comprising m-xylylene diamine[, p-xylylene diamine, hexamethylene diamine, ethylene diamine, or 1,4-cyclohexanedimethylamine, or a mixture thereof], *wherein the ratio of amino end groups to acid end groups in the polyamide is greater than 1:1;*
 wherein components I and II total 100 weight % of the polymer blend, *and*
 *wherein the article is a molded article, a thermoformed article, a packaging material, a film, a sheet, a fiber, a pipe, a tube or a profile.*

15. A method for reducing gas permeability of polyester in an article, comprising blending:
 I. from about 80 to about [97] *92* weight % of a semi-crystalline polyester, which comprises the residues of:
  (A) a dicarboxylic acid component comprising repeat units from at least about 85 mole % of terephthalic acid, naphthalene-2,6-dicarboxylic acid or a mixture thereof; and
  (B) a glycol component comprising repeat units from at least about 85 mole % ethylene glycol,
 wherein components A) and B) are based on 100 mole % dicarboxylic acid and 100 mole % of glycol; and
 II. [from about 20 to about 3 weight %] *a low molecular weight polyamide in an amount effective to impart reduced gas permeability to the article compared to an article comprising the semi-crystalline polyester alone, wherein the polyamide is present in an amount of from about 20 to about 8 weight%,* having a number average molecular weight of [less than about 15,000] *5,800 or less, and* having the repeating unit A-D, wherein A is the residue of a dicarboxylic acid comprising adipic acid[, isophthalic acid, terephthalic acid, 1,4-cyclohexanedicarboxylic, resorcinol dicarboxylic acid, or naphthalenedicarboxylic acid, or a mixture thereof], and D is a residue of a diamine comprising m-xylylene diamine[, p-xylylene diamine, hexamethylene diamine, ethylene diamine, or 1,4-cyclohexanedimethylamine, or a mixture thereof], *wherein the ratio of amino end groups to acid end groups in the polyamide is greater than 1:1;*
 wherein componens I and II total 100 weight % of the polymer blend, *and producing the article from the blend,*
 *wherein the article is a molded article, a thermoformed article, a packaging material, a film, a sheet, a fiber, a pipe, a tube or a profile.*

16. An article[comprising], *which comprises* a polymer blend comprising:
 I. from 80 to [97.5] *about 92* weight % of a semi-crystalline polyester, which comprises the residues of
  (A) a dicarboxylic acid component comprising repeat units from at least about 80 mole % of terephthalic acid, naphthalene-2,6-dicarboxylic acid or a mixture thereof; and
  (B) a glycol component comprising repeat units from at least about 85 mole % ethylene glycol,
 wherein components A) and B) are based on 100 mole % dicarboxylic acid and 100 mole % of glycol; and
 II. [from 20 to 2.5 weight % of] a low molecular weight polyamide *in an amount effective to impart reduced gas permeability to the article compared to an article comprising the semi-crystalline polyester alone, wherein the polyamide is present in an amount of from 20 to about 80 weight %,* having a number average molecular weight of [less than about 15,000] *5,800 or less, and* having the repeating unit A-D, wherein A is the residue of a dicarboxylic acid comprising adipic acid[, isophthalic acid, terephthalic acid, 1,4-cyclohexanedicarboxylic acid, resorcinol dicarboxylic acid, or naphthalenedicarboxylic acid, or a mixture thereof], and D is a residue of a diamine comprising m-xylylene diamine[, p-xylylene diamine, hexamethylene diamine, ethylene diamine, or 1,4-cyclohexanedimethylamine, or a mixture thereof], *wherein the ratio of amino end groups to acid end groups in the polyamide is greater than 1:1;*
 wherein components I and II total 100 weight % of the polymer blend and wherein the article has a haze value of from about 2 to about 5 times less than a polymer blend comprising polyester terephthalate and MXD6, *and*
 *wherein the article is a molded article, a thermoformed article, a packaging material, a film, a sheet, a fiber, a pipe, a tube or a profile.*

18. *The article of claim 1, wherein the article is a stretch blow molded film or container, an injection blow molded container, or an extrusion blow molded film or container.*

19. *The article of claim 1, wherein the article is a bottle.*

20. *The article of claim 1, wherein the polyamide is poly (m-xylylene adipamide).*

21. *An article, which comprises a polymer blend comprising:*
 I. *from 80 to about 92 weight % of a semi-crystalline polyester, which comprises the residues of*
  (A) *a dicarboxylic acid component comprising repeat units from at least about 85 mole % of terephthalic acid, naphthalene-2,6-dicarboxylic acid or a mixture thereof; and*
  (B) *a glycol component comprising repeat units from at least about 85 mole % ethylene glycol,*
 *wherein components A) and B) are based on 100 mole % dicarboxylic acid and 100 mole % of glycol; and*
 II. *a low molecular weight polyamide in an amount effective to impart reduced gas permeability to the article compared to an article comprising the semi-crystalline polyester alone, wherein the polyamide is present in an* amount of from 20 to about 8 weight %, having a number average molecular weight of 5,800 or less, and having the repeating unit A-D, wherein A is the residue of a dicarboxylic acid comprising adipic acid, and D is a residue of a diamine comprising m-xylylene diamine, wherein the ratio of amino end groups to acid end groups in the polyamide is greater than 1:1;

wherein components I and II total 100 weight % of the polymer blend, and wherein the article is a molded article, thermoformed article, a film, a sheet, a pipe, a tube or a profile.

22. The article of claim 21, wherein the dicarboxylic acid component of the semi-crystalline polyester comprises terephthalic acid.

23. The article of claim 21, wherein the dicarboxylic acid component of the semi-crystalline polyester comprises naphthalenedicarboxylic acid.

24. The article of claim 21, wherein the dicarboxylic acid component of the semi-crystalline polyester is modified with up to about 15 mole % of phthalic acid, cyclohexanedicarboxylic acid, cyclohexanediacetic acid, diphenyl-4,4'-dicarboxylic acid, succinic acid, glutaric acid, adipic acid, azelaic acid, sebacic acid or a mixture thereof.

25. The article of claim 21, wherein the glycol component further comprises diethylene glycol, triethylene glycol, 1,4-cyclohexanedimethanol, neopentyl glycol, 1-3-propane diol, 1,4-butane diol, 1,5-pentane diol, 1,6-hexane diol, 3-methylpetanediol-(2,4), 2-methylpentanediol (1,4), 2,2,4-trimethylpentane-diol-(1,3), 2-ethylhexanediol-(1,3), 2,2-diethylpropane-diol (1,3), hexanediol-(1,3), 1,4-di-(hydroxyethoxy)-benzene, 2,2-bis-(4-hydroxycyclohexyl)-propane, 2,4-dihydroxy-1,1,3,3-tetramethylcyclobutane, 2,2-bis-(3-hydroxyethoxyphenyl)-propane, 2,2-bis (4 hydroxypropoxyphenyl)-propane or a mixture thereof.

26. The article of claim 21, wherein the blend further comprises a multifunctional polyol comprising trimethylolpropane, pentaerythritol or glycerol.

27. The article of claim 21, wherein the polyester has an inherent viscosity of from about 0.05 to about 1.0 dL/g as measured in a mixture of 60 weight percent phenol and 40 weight percent 1,1,2,2-tetrachloroethane at a concentration of 0.5 g/100 ml solvent at 25° C.

28. The article of claim 21, wherein the article is a bottle, sheet, film, tubing, profile, or preform.

29. The article of claim 21, wherein the article is a stretch blow molded film or container, an injection blow molded container, or an extrusion blow molded film or container.

30. The article of claim 21, wherein the article is a bottle.

31. The article of claim 21, wherein the polyamide is poly (m-xylylene adipamide).

32. A method for reducing gas permeability of polyester in an article, comprising blending:

I. from 80 to about 92 weight % of a semi-crystalline polyester, which comprises the residues of
(A) a dicarboxylic acid component comprising repeat units from at least about 85 mole % of terephthalic acid, naphthalene-2,6-dicarboxylic acid or a mixture thereof; and
(B) a glycol component comprising repeat units from at least about 85 mole % ethylene glycol, wherein components A) and B) are based on 100 mole % dicarboxylic acid and 100 mole % of glycol; and II. a low molecular weight polyamide in an amount effective to impart reduced gas permeability to the article compared to an article comprising the semi-crystalline polyester alone, wherein the polyamide is present in an amount of from 20 to about 8 weight %, having a number average molecular weight of 5,800 or less, and having the repeating unit A-D, wherein A is the residue of a dicarboxylic acid comprising adipic acid, and D is a residue of a diamine comprising m-xylylene diamine, wherein the ratio of amino end groups to acid end groups in the polyamide is greater than 1:1;

wherein components I and II total 100 weight % of the polymer blend, and producing the article from the blend, wherein the article is a molded article, a thermoformed article, a film, a sheet, a pipe, a tube or a profile.

33. An article, which comprises a polymer blend comprising:

I. from 80 to about 94 weight % of a semi-crystalline polyester, which comprises the residues of
(A) a dicarboxylic acid component comprising repeat units from at least about 80 mole % of terephthalic acid, isophthalic acid, naphthalene-2,6-dicarboxylic acid or a mixture thereof; and
(B) a glycol component comprising repeat units from at least about 85 mole % ethylene glycol, wherein components A) and B) are based on 100 mole % dicarboxylic acid and 100 mole % of glycol and II. a low molecular weight polyamide in an amount effective to impart reduced gas permeability to the article compared to an article comprising the semi-crystalline polyester alone, wherein the polyamide is present in an amount of from 20 to about 6 weight %, having a number average molecular weight of 5,800 or less, and having the repeating unit A-D, wherein A is the residue of a dicarboxylic acid comprising adipic acid, and D is a residue of a diamine comprising m-xylylene diamine, wherein the ratio of amino end groups to acid end groups in the polyamide is greater than 1:1;

wherein components I and II total 100 weight % of the polymer blend, and wherein the article is a molded article, a thermoformed article, a packaging material, a film, a sheet, a fiber, a pipe, a tube or a profile.

34. An article, which comprises a polymer blend comprising:

I. from 80 to about 93 weight % of a semi-crystalline polyester, which comprises the residues of
(A) a dicarboxylic acid component comprising repeat units from at least about 80 mole % of terephthalic acid, isophthalic acid, naphthalene-2,6-dicarboxylic acid or a mixture thereof; and
(B) a glycol component comprising repeat units from at least about 85 mole % ethylene glycol, wherein components A) and B) are based on 100 mole % dicarboxylic acid and 100 mole % of glycol; and II. a low molecular weight polyamide in an amount effective to impart reduced gas permeability to the article compared to an article comprising the semi-crystalline polyester alone, wherein the polyamide is present in an amount of from 20 to about 7 weight %, having a number average molecular weight of 5,800 or less, and having the repeating unit A-D, wherein A is the residue of a dicarboxylic acid comprising adipic acid, and D is a residue of a diamine comprising m-xylylene diamine, wherein the ratio of amino end groups to acid end groups in the polyamide is greater than 1:1;

wherein components I and II total 100 weight % of the polymer blend, and wherein the article is a molded article, a thermoformed article, a packaging material, a film, a sheet, a fiber, a pipe, a tube or a profile.

* * * * *